US009231862B2

(12) United States Patent
Agarwal et al.

(10) Patent No.: US 9,231,862 B2
(45) Date of Patent: Jan. 5, 2016

(54) SELECTIVE SERVICE BASED VIRTUAL LOCAL AREA NETWORK FLOODING

(71) Applicant: Aruba Networks, Inc., Sunnyvale, CA (US)

(72) Inventors: Gopal Agarwal, Karnataka (IN); Gopakumar Narayanan Nambisan, Karnataka (IN); Sridhar Chandrashekhar, Karnataka (IN); Varun Kudva, Karnataka (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 129 days.

(21) Appl. No.: 14/060,539

(22) Filed: Oct. 22, 2013

(65) Prior Publication Data
US 2015/0109924 A1   Apr. 23, 2015

(51) Int. Cl.
| *H04L 12/721* | (2013.01) |
| *H04L 12/24* | (2006.01) |
| *H04L 29/06* | (2006.01) |
| *H04L 12/46* | (2006.01) |
| *H04L 12/18* | (2006.01) |
| *H04L 12/761* | (2013.01) |

(52) U.S. Cl.
CPC ............ *H04L 45/32* (2013.01); *H04L 12/1886* (2013.01); *H04L 12/4641* (2013.01); *H04L 41/0803* (2013.01); *H04L 69/22* (2013.01); *H04L 45/16* (2013.01); *H04L 45/66* (2013.01)

(58) Field of Classification Search
None
See application file for complete search history.

(56) References Cited

U.S. PATENT DOCUMENTS

| 6,839,348 | B2* | 1/2005 | Tang et al. | 370/390 |
| 7,272,651 | B1* | 9/2007 | Bolding et al. | 709/227 |
| 2010/0290446 | A1* | 11/2010 | Atreya et al. | 370/338 |

* cited by examiner

*Primary Examiner* — Gary Mui
(74) *Attorney, Agent, or Firm* — Mannava & Kang, P.C.

(57) ABSTRACT

The present disclosure discloses a method and network device for selective service based virtual local area network (VLAN) flooding. The disclosed system receives a packet originated from a device received on a first VLAN, and flood one or more copies of the packet to a second and different VLAN if the packet is received on an access port. Furthermore, the system will flood copies of the packet to the first and same VLAN if the packet is received on a trunk port. The device originating the packet is a member of the first VLAN but not a member of the second VLAN.

20 Claims, 8 Drawing Sheets

SELECTIVE SERVICE BASED VIRTUAL LOCAL AREA NETWORK FLOODING

FIELD

The present disclosure relates to network flooding. In particular, the present disclosure relates to a method and system for selective service-based virtual local area network flooding.

BACKGROUND

Zero-configuration networking (zeroconf) typically refers to a set of techniques that automatically creates a usable Internet Protocol (IP) network without manual operator intervention or special configuration servers. Zeroconf protocols can enable service discovery, address assignment, and name resolution for desktop computers, mobile devices, and network devices. Different vendors often devises out their own approaches to achieve zero-configuration networking based on various public drafts and/or standards. Most standards use multicast-based link-local multicast addresses as a part of the solution, for example, multicast Domain Name System (mDNS) as defined in IETF RFC 6762, Link-local Multicast Name Resolution (LLMNR) as defined in IETF RFC 4795, etc.

The conventional zeroconf protocols mentioned above usually use link-local multicast packets which cannot cross boundaries between virtual local area networks (VLANs). As a result, network discovery becomes highly restrictive and is suited for small office/home office (SOHO) type of networks. Therefore, network discovery with conventional zeroconf protocols often cannot be used in an enterprise local area network deployment. For example, user devices such as an iPad on VLAN 30 will not be able to discover an AppleTV on VLAN 20.

When a router is enabled to propagate mDNS traffic between VLANs across wired and wireless networks, the wireless network is flooded with mDNS traffic that consumes valuable wireless airtime resources. Aruba AirGroup™ is a solution for wireless networks to address zeroconf networking based on mDNS protocol. By adding mDNS proxy capabilities to enterprise WLANs, mDNS messages can be forwarded across multiple subnets or VLANs. With adoption of multicast optimization algorithms, mDNS messages can be forwarded to targeted user devices based on various network policies, and thus preventing excessive multicast traffic over the WLAN.

Nevertheless, for wired networks, it isn't cost effective to adopt policy-based multicast optimization algorithms for mDNS on low cost network switches. Rather, there needs to be a light weight mechanism that can overlay virtual broadcast domains on an underlying physical network. Such mechanism shall be leveraged for any request/response based services, which is based on link-local flooding.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to network flooding, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to networking flooding. In particular, the present disclosure relates to a method and system for selective service-based VLAN flooding. Specifically, the disclosed system receives a packet originated from a device received on a first VLAN, and flood one or more copies of the packet to a second and different VLAN if the packet is received on an access port. Furthermore, the system will flood copies of the packet to the first and same VLAN if the packet is received on a trunk port. The device originating the packet is a member of the first VLAN but not a member of the second VLAN.

Broadcast Domain

Figure 1A:
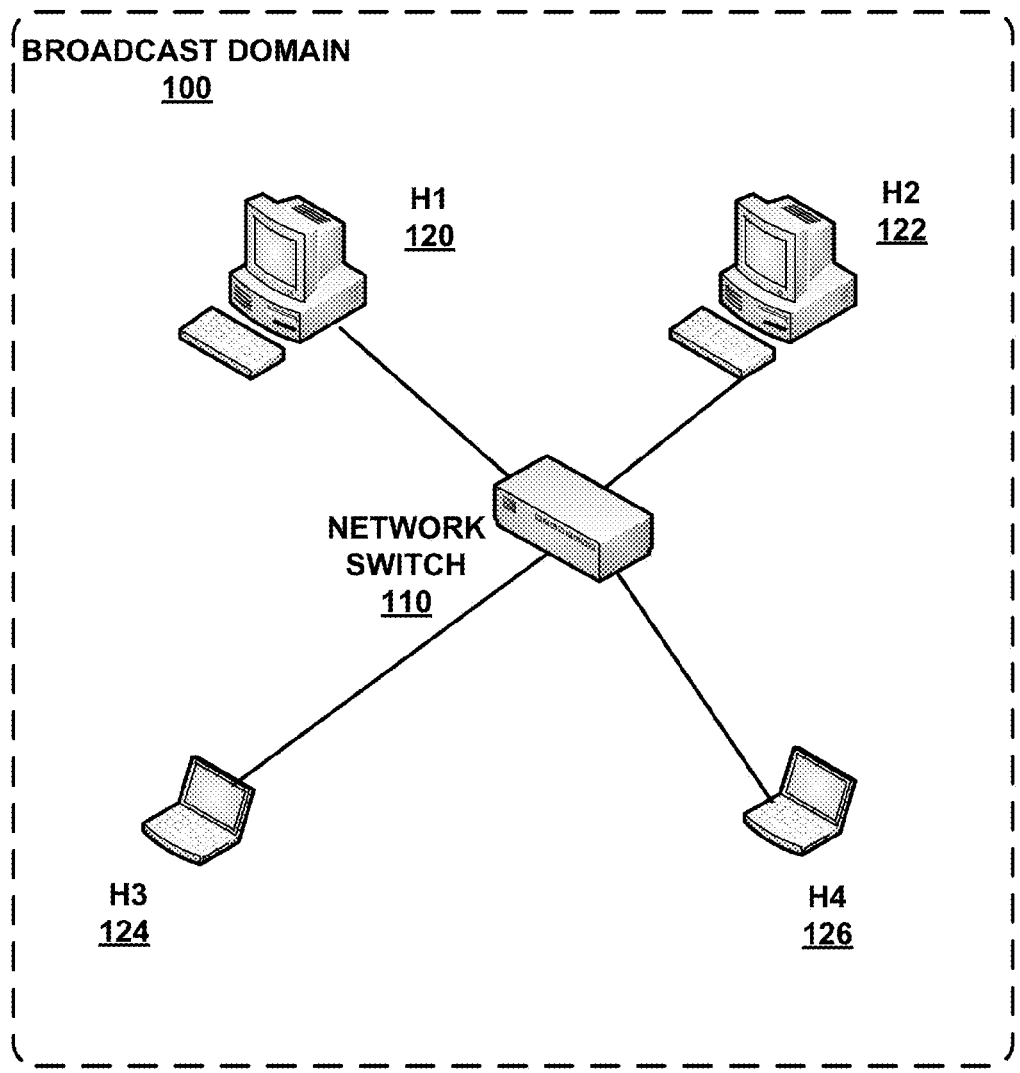
FIG. 1A illustrates an exemplary broadcast domain according to embodiments of the present disclosure.

FIG. 1A illustrates a broadcast domain according to embodiments of the present disclosure. The disclosed system in FIG. 1A includes a broadcast domain 100, a plurality of servers, network devices, and/or client devices, such as H1 120, H2, 122, H3 124, and H4 126. Switch 110 is interconnected with H1 120, H2 122, H3 124, and H4 126 via a plurality of wired interfaces, for example, access ports. In the example illustrated in FIG. 1A, all four access ports on network switch 110 are configured for broadcast domain 100. Thus, any multicast and/or broadcast message, such as an mDNS message, received at switch 110 from any of H1-H4 120-126 is forwarded to all of the other devices among H1-H4 120-126 that are on the same VLAN or broadcast domain by switch 100. Note that, FIG. 1A is a simplified example used for illustration purposes only. In scalable enterprise local area networks, multiple network switches can be deployed with multiple broadcast domains configured on each network switch. Nevertheless, each network switch functions in similar fashion. For example, upon receiving a multicast message at a port, such as an access port, the switch will duplicate copies of the received multicast message and forward each duplicated copy of the multicast message to a port that is also configured with the same LAN as the VLAN corresponding to the port where the original multicast message is received.

Devices H1-H4 can be a server, a network device, and/or a client device. A network device generally refers to devices providing for network traffic transmission services, such as a network controller, an access point, a router, etc. A network controller may be a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc.

An access point may be interconnected with zero or more client devices via either a wired interface or a wireless interface. An access point generally refers to a network device that allows wireless clients to connect to a wired network. Access points usually connect to other network devices via a wired or wireless network.

A router can forward traffic to and receive traffic from the Internet. The router generally is a network device that forwards data packets between different networks, and thus creating an overlay internetwork. A router is typically connected to two or more data lines from different networks. When a data packet comes in one of the data lines, the router reads the address information in the packet to determine its destination. Then, using information in its routing table or routing policy, the router directs the packet to the next/different network. A data packet is typically forwarded from one router to another router through the Internet until the packet gets to its destination.

A client device may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network.

Figure 1B:
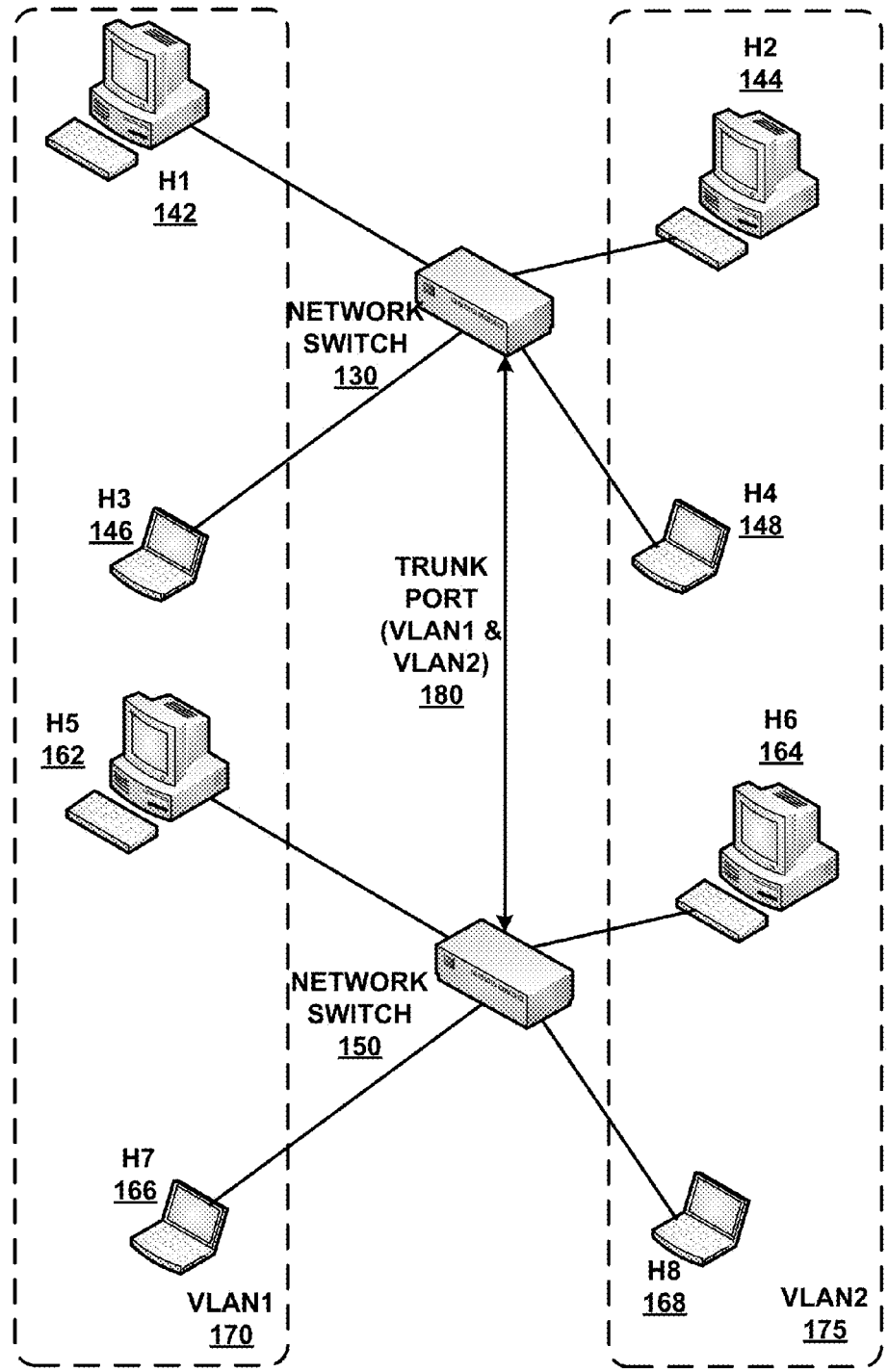
FIG. 1B illustrates exemplary broadcast domains according to embodiments of the present disclosure.

FIG. 1B illustrates exemplary broadcast domains according to embodiments of the present disclosure. The disclosed system in FIG. 1B includes two VLANs, namely VLAN1 170 and VLAN2 175. For illustration purposes only, VLAN1 170 includes devices such as H1 142, H3 146, H5 162, and H7 166, etc. Likewise, VLAN2 175 in this example includes devices such as H2 144, H4 148, H6 164, and H8 168, etc. VLAN generally refers to a layer-2 network logically partitioned to create multiple broadcast domains, which are mutually separated such that packets can only pass between two or more VLANs via one or more routers. Here, a broadcast or multicast message originated from a device within VLAN1 170 will only be forwarded to other devices that belong to VLAN1 170; and, a broadcast or multicast message originated from VLAN2 175 will only be forwarded to other devices that belong to VLAN2. Because VLAN is a logical concept, multiple network devices that are physically located apart from each other may nonetheless be allowed to be within the same broadcast domain.

Also, FIG. 1B includes two network switches, e.g., network switch 130 and network switch 150. Specifically, network switch 130 is connected to H1 142, H2 144, H3 146 and H4 148; and, network switch 150 is connected to H5 162, H6 164, H7 166, and H8 168. As mentioned above, devices H1-H4 142-148 and H5-H8 162-168 can be a server, a network device, and/or a client device. The VLAN technique is usually achieved on switch or router devices. A device may support VLAN partitioning at a port level. For example, an access port of a switch or router device may be configured for a particular VLAN. Here, network switch 130 has four access ports. The two access ports that are connected to H1 142 and H3 146 are configured for VLAN1 170; and, the other two access ports that are connected to H2 144 and H4 148 are configured for VLAN2 175. Likewise, network switch 150 also has four access ports. The two access ports that are connected to H5 162 and H7 166 are configured for VLAN1 170; and, the other two access ports that are connected to H6 164 and H8 168 are configured for VLAN 2 175.

Furthermore, sophisticated network devices can mark packets through VLAN tagging, such that a single interconnect (e.g., a trunk port) may be used to transport data for various VLANs. The network devices could determine which of the multiple supported VLANs that a packet should be transmitted on based on the VLAN tag included in the packet. As an example, here, the two network switches 130 and 150 are interconnected with each other. A trunk port is configured for the interconnection at each switch to support both VLAN1 170 and VLAN2 175. During operations, based on the VLAN on which a particular packet is received through an access port, a switch will dynamically determine whether to send the packet through VLAN1 170 or VLAN2 175 via the trunk port to the other switch.

For example, assuming that H1 142 sends a multicast or broadcast packet. Because H1 142 belongs on VLAN1 170, the packet is only intended to be received by H3 146, H5 162, and H7 166. To do so, when network switch 130 receives the multicast or broadcast packet at the access port connected to H1 142, network switch 130 determines that the packet is to be forwarded on VLAN1 170 based on the VLAN configured for the access port. Next, network switch 130 duplicates a copy of the multicast or broadcast packet for each of its other access ports that are configured for the same VLAN, e.g., VLAN1 170. Thus, here, network switch 130 duplicates one copy of the packet to be transmitted through the access port connected to H3 146, because that access port is the only other access port configured for VLAN1 170 at network switch 130 in this example. Moreover, network switch 130 will duplicate a copy of the multicast or broadcast packet to be transmitted over the trunk port on VLAN1 170, such that other devices belonging to VLAN1 170 that are connected to network switch 150 can receive the packet.

When network switch 150 receives the packet via trunk port, network switch 150 can determine that the packet is to be transmitted on VLAN1, for example, based on the VLAN tag. Network switch 150 then duplicates a copy of the packet for each access port that is configured for the same VLAN, e.g., VLAN1 170. In this example, network switch 150 will duplicate two copies of the packet for transmission via the two access ports connected to H5 162 and H7 166 respectively.

Accordingly, the scope of broadcast domain is limited to each VLAN. Thus, with conventional VLAN schemes, whenever an application at a client device sends a multicast or broadcast packet, the packet is transmitted only to other devices within the same VLAN. However, in many scenarios, an application at a device may need to send a multicast or broadcast packets to multiple VLANs. Therefore, a packet with a multicast or broadcast destination address may need to be transmitted on multiple VLANs. To do so, the system must be able to flood multicast packets across VLAN boundaries regardless of the protocol-specific details (e.g. mDNS). The following sections describe dynamic rules based on which the flooding of multicast and/or broadcast packets is allowed across few selected VLANs.

Selective Service-Based VLAN Flooding Scheme

When it is necessary for multicast or broadcast packets to be transmitted across VLAN boundaries, a router is typically required to forward the traffic from one sub-network to another sub-network during the flooding. This would generate much unnecessary traffic on the network.

Furthermore, device discovery becomes very restrictive. For example, a client device in one sub-network would not be able to discover another server device in a different sub-network, although they were both in the same network with the same network identifier. Thus, for a typical enterprise local area network deployment with multiple VLANs configured in a single WLAN network, the server executing zeroconf protocols needs to be a part of multiple different VLANs in order to be visible to different users across multiple VLANs.

Certain prior solutions have been developed to address the zeroconf protocol, e.g., mDNS protocol, limitations described above. However, for wireless networks, flooding is not feasible. On the other hand, for wired networks, operating a zeroconf protocol, such as mDNS, still can be a challenge. Although flooding can be performed in wired networks, running solutions that consumes a large amount of resource on low cost switches is not cost effective. Moreover, if a multicast or broadcast packet is flooded to all VLANs in a wired network, the switches will be forwarding the packet in loops in the network. When multicast or broadcast packets are forwarded in a loop, the network will be saturated by the multicast/broadcast traffic and becomes unusable quickly.

The selective service-based VLAN flooding scheme disclosed herein has the following advantages: First, it is easy to implement and lightweight, e.g., requiring few system resources. Second, the scheme can be leveraged for any request and/or response based services that are based on link-local flooding. Third, the scheme allows for overlaying virtual broadcast domains on an underlying physical network.

According embodiments of the present disclosure, when a layer-2 network includes multiple independent broadcast domains, the disclosed system treats the multiple independent broadcast domains in a L2 network as a single broadcast domain. The system then divides the single broadcast domain into two or more logical sub-domains, such as a service VLAN and a user VLAN. Thus, the system effectively creates a virtual broadcast domain on top of the underlying physical network. The system determines which of the logical sub-domains to flood the packet based on classification of the incoming packets. Subsequently, the system will mark the packet as being either a server-type packet or a user-type packet by inspecting contents of the packets, e.g., by performing deep packet inspections (DPIs). The system will be flooding the packets to different logical sub-domains based on the classified packet type.

A. Incoming Packets Classification

A packet received in datapath from an end device can be classified as belonging to a particular service based on header information within the packet, for example, the Layer 4 port information identifying the destination TCP or UDP port for the packet.

When a packet is received from an unknown device for the first time by the system, a deep packet inspection (DPI) is performed on the packet. The DPI will look for application-specific information, and determine whether the packet is a response packet or a request packet. If the packet is determined to be a request packet, the packet is classified as a "user packet." On the other hand, if the packet is determined to be a response packet, the packet is classified as a "service packet."

For ease of description, hereinafter, a "service packet" generally refers to a packet that is originated from a server providing a service; and, a "user packet" generally refers to a packet originated from a user or client device requesting for or consuming the service. Moreover, the layer-5 header (e.g., Application layer header) can be used to further classify service packets into sub-categories.

B. Marking VLANs

When a "service packet" is received from a particular server for the first time, the system will derive a logical VLAN for the particular server providing a specific service based on various techniques, such as, role-based VLAN derivation, etc. These techniques will be discussed in details in subsequent sections. Hereinafter, the logical VLAN is also referred to as "service VLAN."

Note that, "service VLAN" generally refers to a logical VLAN the membership of which can be dynamically determined. For example, while a device transmits traffic that is not specific to the service associated with the "service VLAN," the packets will be transmitted or forwarded on a different service VLAN or logical sub-domain. If the traffic does not correspond to any "service VLAN," the packets will be transmitted on a native VLAN. However, when the same device is transmitting service-specific traffic that is specific to the service associated with the "service VLAN," the packets associates with the service-specific traffic will be forwarded on the same "service VLAN." Any future packets associated with the same service that originated from the same device will be transmitted also on the same "service VLAN."

In some embodiments, service packets associated with different services can be assigned to a single "service VLAN." In other embodiments, separate "service VLANs" can be assigned to different service packets based on specific details, deployments, and/or implementations of its corresponding service. In other words, for each service, there could either be an individual "service VLAN" for that service, or a global "service VLAN" used for all available services. Note that, assigning a "service VLAN" unique to each service may allow for an optimal packet flooding result compared to assigning multiple services to a single global "service VLAN."

On the other hand, when a request packet is first received from an unknown device, the user device from which the request packet is originated will be associated with a "user VLAN." In some embodiments, the "user VLAN" corresponds to the native VLAN or a derived VLAN that the user device is associated with.

In some embodiments, a software module by the disclosed system maintains two sets of information. The first set of information includes all types of services and their corresponding "service VLAN." The second set of information includes all user devices and their corresponding "user VLAN." Further, the second set of information may be a list of all "user VLANs" that are maintained by the system. In some embodiments, the list can be dynamically updated to include only the active "user VLANs." Further details on maintaining this list is described below in subsequent sections. Also, note that, when a "user packet" is received from a user device on any of the "user VLANs", the "user packet" will be forwarded to all of the servers across all service VLANs.

C. Access Port vs. Trunk Port

Figure 2:
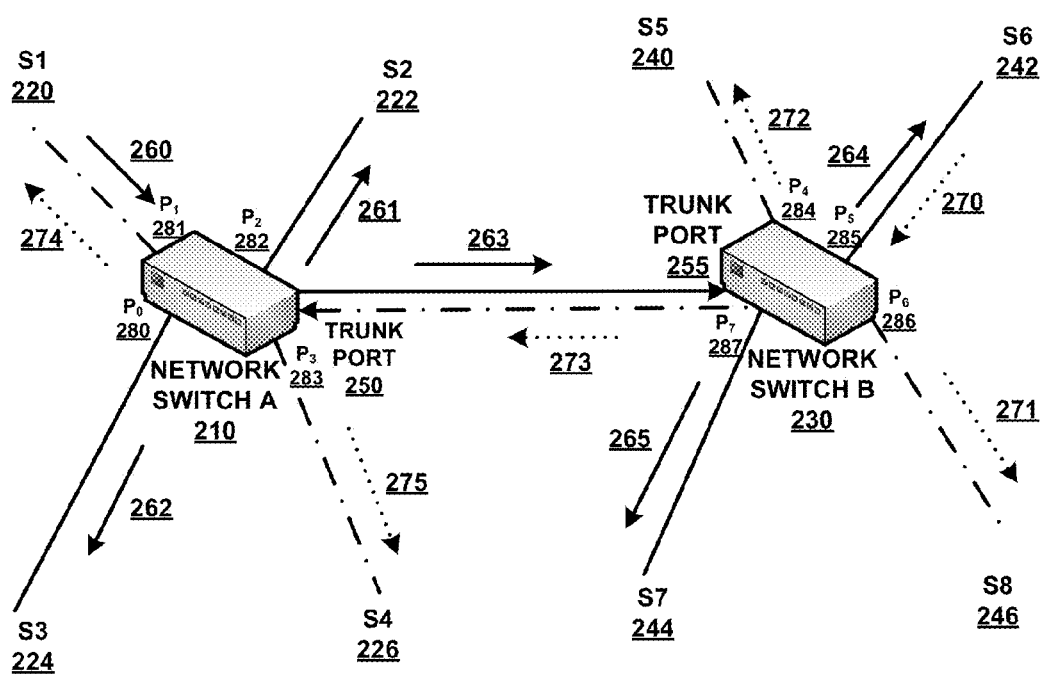
FIG. 2 is a diagram illustrating exemplary operations of access ports and trunk ports at network switches according to embodiments of the present disclosure.

FIG. 2 generally illustrates exemplary operations of access ports and trunk ports at network switches. For illustration purposes only, FIG. 2 includes two network switches, namely network switch A 210 and network switch B 230, which are interconnected with each other between trunk port 250 at network switch A 210 and trunk port 255 at network switch B 230. Trunking is a function that can be enabled on both sides of the link between network switch A 210 and network switch B 230. Moreover, both trunk port 250 at network switch A 210 and trunk port 255 at network switch B 230 are configured with the same VLAN tagging mechanism, for example, in compliance IEEE 802.1Q standards. A trunk port usually is a member of all the VLANs that exist on the switch and carry traffic for all those VLANs between the switches. To distinguish between the traffic flows, a trunk port must mark the frames with special tags as they pass between the switches.

Further, each network switch also has a plurality of access ports that are connected to various devices in the network. For example, network switch A 210 is configured with access ports such as $P_0$ 280, $P_1$ 281, $P_2$ 282, and $P_3$ 283; and, network switch B 230 is configured with access ports such as $P_4$ 284, $P_5$ 285, $P_6$ 286, and $P_7$ 287.

Access ports typically are associated with a single VLAN and do not mark or tag on the frames that are passed between switches. Access ports also carry traffic that comes from only the VLAN assigned to the port. In the example illustrated in FIG. 2, a service VLAN is assigned to $P_0$ 280, $P_2$ 282, $P_5$ 285, and $P_7$ 287; and, a user VLAN is assigned to $P_1$ 281, $P_3$ 283, $P_4$ 284, and $P_6$ 286. According to embodiments of the present disclosure, the service VLAN can be derived based on a plurality of criteria which will be discussed in detail below, and the user VLAN can be derived based on physical layer user VLAN configuration.

In addition, FIG. 2 also includes a plurality of network servers/devices and/or client devices. For example, network switch A 210 is connected to S1 220, S2 222, S3 224, and S4 226 via access ports $P_1$ 281, $P_2$ 282, $P_3$ 283, and $P_0$ 280 respectively. Moreover, network switch B 230 is connected to S5 240, S6 242, S8 246, and S7 247 via access ports $P_4$ 284, $P_5$ 285, $P_7$ 287, and $P_6$ 286 respectively.

During operations, when a request (e.g., request 260) is received via an access port on one VLAN (e.g., user VLAN), network switches (e.g., network switch A 210) will forward a copy of the request via access ports to a different VLAN (e.g., forwarded request 261, 262, and 263 on the service VLAN). On the other hand, when network switch B 230 receives a request (e.g., forwarded request 263) via a trunk port on one VLAN (e.g., service VLAN), network switch B 230 will forward a copy of the request via access ports on the same VLAN (e.g., forwarded request 264 and 265 on the service VLAN).

Similarly, when network switch B 230 receives a response 270 from S6 242 via an access port on the service VLAN, network device B 230 will forward a copy of the response via access ports on the user VLAN (e.g., forwarded response 272, 271 and 273 transmitted on the user VLAN). Subsequently, when network switch A 210 receives forwarded response 273 via a trunk port on a user VLAN, network switch A 210 will forward a copy of the response via access ports to the same VLAN (e.g., forwarded response 274 and 275 transmitted on the user VLAN).

Therefore, by transmitting a network request and/or response packet on the same VLAN when the packet is received via a trunk port, and on a different VLAN when the packet is received via access ports, the network switches selectively flood the packet to a subset of VLANs and effectively prevent forming loops during the transmission of a network packet.

D. Flooding "User" Packet

Figure 3A:
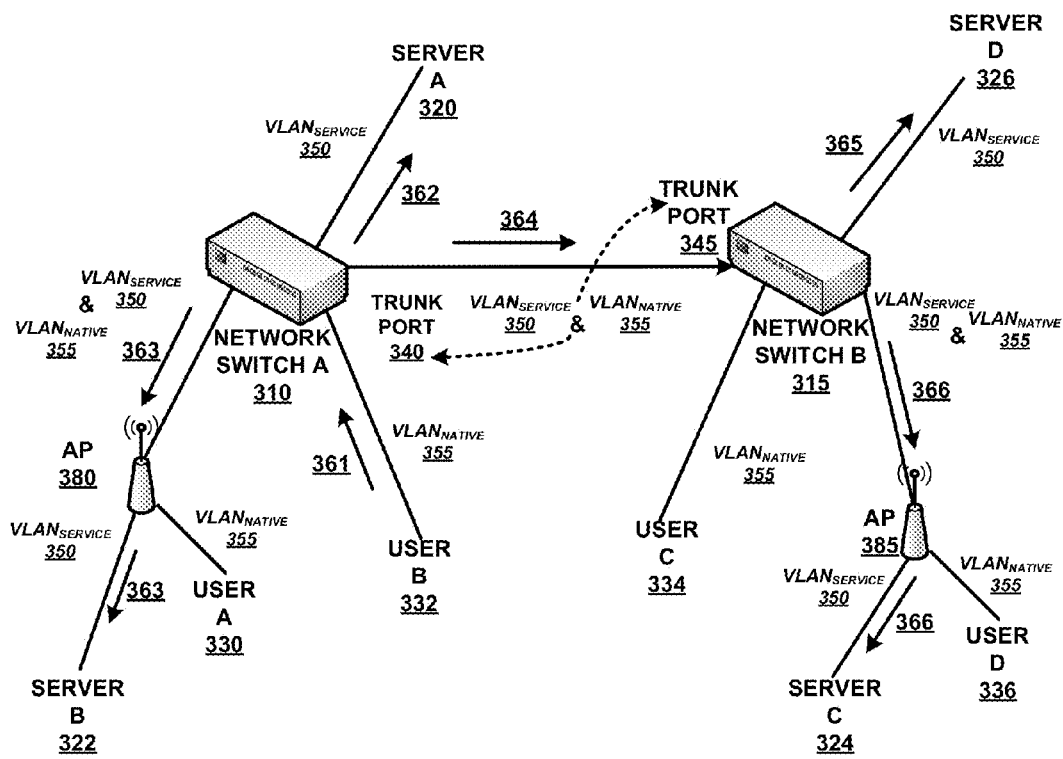
FIGS. 3A-3B illustrate another exemplary use case scenario of selective service-based VLAN flooding according to embodiments of the present disclosure.

FIG. 3A illustrates an example of how to flood a "user" packet based on the selective service-based VLAN flooding scheme according to embodiments of the present disclosure. Note that, the goal of flooding the "user" packet is to allow the packet to reach each and every server in the network even though the servers are connected to multiple and different switches.

In the example illustrated in FIG. 3A, network switch A 310 and network switch B 315 are interconnected via trunk port 340 on network switch A 310 and trunk port 345 on network switch B 315. Moreover, network switch A 310 is connected to server A 320, AP 380, and user B 332 via access ports. AP 380 may further be connected to server B 322 and user A 330. Similarly, network switch B 315 is connected to server D 326, user C 334, and AP 385. Also, AP 385 may be further connected to server C 324 and user D 336.

In addition, both trunk ports 340 and 345 are configured for service VLAN $VLAN_{SERVICE}$ 350 and user VLAN $VLAN_{NATIVE}$ 355. As shown in FIG. 3A, access ports connecting a network switch to a user device will be configured for user VLAN $VLAN_{NATIVE}$ 355; and, access ports connecting a network switch to a server will be configured for service VLAN $VLAN_{SERVICE}$ 350.

With respect to trunk ports 340 and 345, memberships of $VLAN_{SERVICE}$ 350 and $VLAN_{NATIVE}$ 355 can be stored in VLAN membership tables, such as service VLAN membership table and user VLAN membership table. Trunk ports 340 and 345 can use such VLAN membership tables to configure the VLAN memberships. If a network switch is connected to at least one server on the network via an access port, VLAN membership table used for configuring the trunk ports of the switch will include the service VLAN as a member. Similarly, if a network switch is connected to at least one user device on the network via an access port, VLAN membership table used for configuring the trunk ports of the switch will include the user VLAN as a member. Note that, the network switch may be connected to a server and/or user device indirectly via its access port and another network device, such as an access point.

According to embodiments of the present disclosure, a user packet (e.g., packet 361) received from an end device (e.g., user B 332) will be marked for flooding to the service VLAN $VLAN_{SERVICE}$ 350. As such, the user packet (e.g., packets 362-366) will be flooded only on the service VLAN $VLAN_{SERVICE}$ 350, and not on the user VLAN $VLAN_{NATIVE}$ 355, which the packet was received from.

Thus, the flooding is reduced to just one VLAN instead of all VLANs on which the server devices could potentially be available. The service VLAN $VLAN_{SERVICE}$ 350 is configured to be a part of the trunk port on the switches (e.g., network switch A 310 and network switch B 315).

Once the flooding on the service VLAN $VLAN_{SERVICE}$ 350 is initiated, the packet would further be flooded to other switches (e.g., network switch B 315) where server devices (e.g., server C 324 and server D 326) are present. Specifically, after network switch A 310 receives a user packet 361 from user B 332, network switch A 310 will flood a copy of the packet to each of the servers connected to network switch A 310 on service VLAN $VLAN_{SERVICE}$ 350, including packet 362 transmitted to server A 320 and packet 363 transmitted to server B 322. Moreover, network switch A 310 will transmit a copy of the user packet to all other switches connected to network switch A 310 via trunk ports on service VLAN $VLAN_{SERVICE}$ 350.

When a user packet is received from a trunk port, the user packet will be forwarded to the same VLAN that it is received on. For example, when trunk port 345 receives user packet 364 on service VLAN $VLAN_{SERVICE}$ 350, network switch B 315 will forward the packet only to the service VLAN $VLAN_{SERVICE}$ 350 (e.g., packet 365 to server D 326 and packet 366 to server C 324), and not the user VLAN VLAN$_{NATIVE}$ 355. Hence, a user request packet will be able to reach all intended servers in the network, where the servers can be connected to multiple and different network switches.

E. Flooding "Server" Packet

Figure 3B:
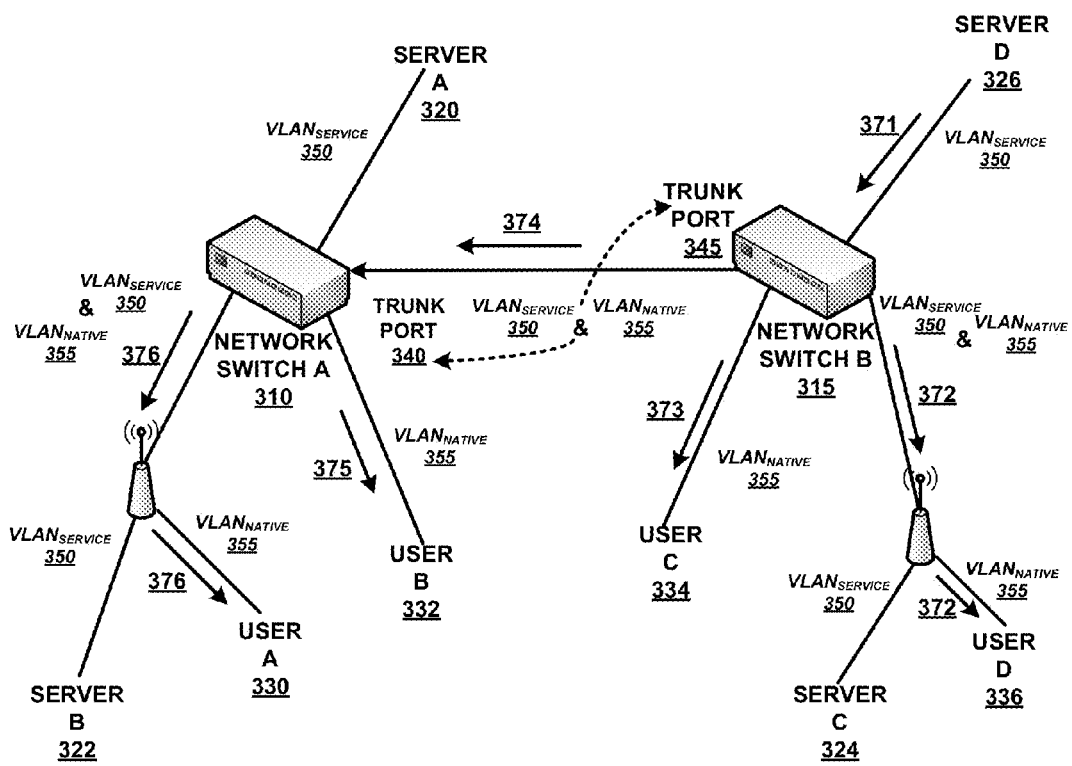

FIG. 3B illustrates an example of how to flood a "server" packet based on the selective service-based VLAN flooding scheme according to embodiments of the present disclosure.

When a response packet is sent back from a server, the response packet should be able to reach the user device from which the corresponding request packet that requests a particular service by the server is generated. Also, the response packet should be able to reach all other user devices in the network as well. This is because if other user devices need to consume the same service offered by the server, the user device can receive the response packet in advance prior to sending out another flooding request packet. Hence, transmitting the response packet from the server to all user devices will mitigate the network load caused by the flooding from multiple request packets from different users requesting for the same service from the same server in the network.

In the example illustrated in FIG. 3B, network switch A 310 and network switch B 315 are interconnected via trunk port 340 on network switch A 310 and trunk port 345 on network switch B 315. Moreover, network switch A 310 is connected to server A 320, AP 380, and user B 332 via access ports. AP 380 may further be connected to server B 322 and user A 330. Similarly, network switch B 315 is connected to server C 326, user C 334, and AP 385. Also, AP 385 may be further connected to server C 324 and user D 336.

In addition, both trunk ports 340 and 345 are configured for service VLAN VLAN$_{SERVICE}$ 350 and user VLAN VLAN$_{NATIVE}$ 355. As shown in FIG. 3B, access ports connecting a network switch to a user device will be configured for user VLAN VLAN$_{NATIVE}$ 355; and, access ports connecting a network switch to a server will be configured for service VLAN VLAN$_{SERVICE}$ 350.

With respect to trunk ports 340 and 345, memberships of VLAN$_{SERVICE}$ 350 and VLAN$_{NATIVE}$ 355 can be stored in VLAN membership tables, such as service VLAN membership table and user VLAN membership table. Trunk ports 340 and 345 can use such VLAN membership tables to configure the VLAN memberships. If a network switch is connected to at least one server on the network via an access port, VLAN membership table used for configuring the trunk ports of the switch will include the service VLAN as a member. Similarly, if a network switch is connected to at least one user device on the network via an access port, VLAN membership table used for configuring the trunk ports of the switch will include the user VLAN as a member. Note that, the network switch may be connected to a server and/or user device indirectly via its access port and another network device, such as an access point.

According to embodiments of the present disclosure, a server packet (e.g., packet 371) received from a server (e.g., server D 326) will be marked for flooding to the user VLAN VLAN$_{NATIVE}$ 355. As such, the server packet (e.g., packets 372-376) will be flooded only on the user VLAN VLAN$_{NATIVE}$ 355, and not on the service VLAN VLAN$_{SERVICE}$ 350, which the response packet was received from.

The user VLAN VLAN$_{NATIVE}$ 355 is configured to be a part of the trunk port on the switches (e.g., network switch A 310 and network switch B 315). Once the flooding on the user VLAN VLAN$_{NATIVE}$ 355 is initiated, the packet would further be flooded to other switches (e.g., network switch A 310) where user devices (e.g., user A 330 and user B 332) are present. Specifically, after network switch A 315 receives a server packet 371 from server D 326, network switch B 315 will flood a copy of the packet to each of the user devices connected to network switch B 315 on user VLAN VLAN$_{NATIVE}$ 355, including packet 372 transmitted to user D 336 and packet 373 transmitted to user C 334. Moreover, network switch B 315 will transmit a copy of the server packet to all other switches connected to network switch B 315 via trunk ports on user VLAN VLAN$_{NATIVE}$ 355.

When a service packet is received from a trunk port, the service packet will be forwarded to the same VLAN that it is received on. For example, when trunk port 340 receives server packet 374 on user VLAN VLAN$_{NATIVE}$ 355, network switch A 310 will forward the packet only to the user VLAN VLAN$_{NATIVE}$ 355 (e.g., packet 375 to user B 332 and packet 376 to user A 330), and not the service VLAN VLAN$_{SERVICE}$ 350. Hence, a server response packet will be able to reach all user devices in the network, where the user devices can be connected to multiple and different network switches.

Note that, there could potentially be multiple "server" packets being flooded in response to a particular "user" packet. As previously mentioned, this "server" packet should reach the user who originally sent the "user" request packet. In addition, this "server" packet could potentially reach all other user VLANs to scuttle intent by users who were about to send a "user" request packet requesting the same service from the network. To facilitate this, all user VLANs will be added to trunk ports on each switch.

Because the "server" packet received from a server should always be flooded to all user VLANs available on the switch, the "server" packet would traverse through multiple switches and reach out to all intended users on the user VLAN list for that service available on that switch. On the other hand, a "server" packet received from an end device or user device on a "service VLAN" should never be flooded on the "service VLAN" itself to avoid forming loops in the network.

The flooding mechanism described herein ensures that all possible user VLANs are added to all trunk ports on a switch, such that a "server" packet can be forwarded to other switches, and thus reaching all intended users in the network.

Service Identification

Figure 4:
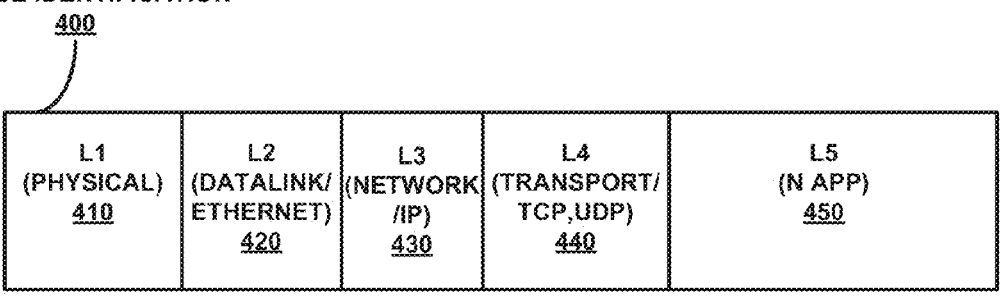
FIG. 4 illustrates an exemplary service identification according to embodiments of the present disclosure.

FIG. 4 illustrations an exemplary service identification in accordance to embodiments of the present disclosure. Specifically, service identification 400 includes a plurality of headers, such as L1 (i.e. physical layer) header 410, L2 (i.e., data link and/or Ethernet) header 420, L3 (i.e., network layer and/or Internet Protocol) header 430, L4 (i.e., transport layer, TCP, and/or UDP) header 440, and L5 (i.e., application layer) header 450.

More specifically, L4 header 440 includes a destination port number, which facilitates clarifying which particular service a packet is associated with. Further, L5 header 450 can clarify whether a particular packet is a response packet or a request packet. A request packet generally refers to a packet by which a user requests a service (also referred to as "user packet" interchangeably). On the other hand, a response packet generally refers to a packet by which server provides a service (also referred to as "server packet" interchangeably).

If the packet is a response packet, the associated server is listed under a specific configured VLAN, e.g., service VLAN. The service VLAN can be derived based on service VLAN derivation mechanisms described in details in subsequent sections. Any future packets from the server will be associated with the same service VLAN. If, on the other hand, the packet is a request packet, the associated user is listed under a native VLAN, e.g., user VLAN, on which the user packet is received. A mechanism for dynamically maintaining a list of all user VLANs is described in details below.

"User VLAN" Membership Maintenance

According to embodiments of the present disclosure, when flooding a server response packet, the switch will generate multiple copies of the packet (one packet per user VLAN). The server response packet is transmitted on each and every user VLAN.

The "user VLAN" membership is maintained, e.g., as a table or a list, on a switch. A user VLAN gets added to the membership table or list when a "user" packet is received on a VLAN. Subsequently, a "server" packet gets flooded on all user VLANs available in the user VLAN membership table or list.

In some embodiments, it is possible to maintain liveliness for "user" packets on VLANs in the user VLAN membership table or list. For example, if a "user" packet is not received on a specified user VLAN for a predetermined period of time, the corresponding user VLAN will be deleted from the user VLAN membership table or list. Thus, the user VLAN membership table or list would dynamically change and reflect only the active user VLANs with recent packet transmissions. This enhancement would result in reduced flooding of "server" packets on the user VLANs.

Regardless of the dynamically maintained user VLAN membership table or list, all possible user VLANs will be added to the trunk port on each switch. A "server" packet would be discarded by a switch if its corresponding user VLAN has been removed from the 'user VLAN' list on that switch, for example, due to prolonged inactivity.

Service VLAN Derivation

Service VLAN can be configured statically by a network administration with a network management system or dynamically derived based on various factors. The ability to dynamically derive a service VLAN is important to enable zeroconf. Note that, as opposed to service VLAN which is a separate VLAN configured to transfer server packets, user VLAN is the native VLAN of the port or a VLAN derived by other means. Thus, no special VLAN is needed for transmitting user packets.

Multiple ways can be used to derive a service VLAN for a user based on the nature of service provided by the user. For example, a service VLAN can be derived based on one or more of: (a) Media Access Control authentication; (b) a user role; (c) a specific service protocol (e.g. mDNS); and (d) network policy and user registration.

(a) MAC Address

The disclosed system may maintain a pre-configured list in which each MAC address of a server is mapped to a specific service VLAN. The disclosed system can use the list to determine which service VLAN a server belongs to by performing a lookup in the pre-configured list.

(b) User Role

Each server can be assigned a user role. Any device including network services, when performing a network authentication, e.g., IEEE 802.1x authentication, will be assigned a user role. Based on the user role that is specific to a particular service provided by a particular server, the system can derive a service VLAN. Multiple servers connected to multiple switches in the network can be dynamically assigned to the same user role. The same service VLAN would be derived for such servers.

Note that, the disclosed system can determine whether a received packet is a first request or response packet by performing a deep packet inspection (DPI). If the packet is determined to be a first request packet, the packet is marked as a user packet. If the packet is determined to be a first response packet, the packet is marked as a server packet. Any future packets from the same device will be marked as the same type of packets. As described above, a user packet will be flooded on all service VLANs, and a server packet will be flooded on all user VLANs.

In addition, when a number of "users" (here refer to the server devices configured as "users") can all be assigned a specific role, and thus any packet received from a device falling into this role, will be assigned to the derived VLAN at the very beginning. This is a rather strict way of deriving VLAN because each server (and thus user role) must be configured in order to derive its corresponding VLAN.

(c) Specific Service Protocol

A service VLAN can be dedicated to a particular service based on a specific service protocol, e.g., mDNS, LLMNR, etc. In some embodiments, a service VLAN can be associated with a specific multicast address. If a packet has a destination address that matches the specific multicast address associated with a particular service VLAN, the packet will be flooded to the particular service VLAN. In sum, one or more service VLANs can be used for a plurality of servers providing network services through a specific service protocol. Deriving service VLAN based on specific service protocol provides maximum flexibility without requiring any extra configuration.

(d) Network Policy and User Registration

When a network policy manager is deployed in the network, the disclosed system can leverage the network policy manager. Specifically, user registrations can be defined in the network policy manager for a server. As such, whenever a server connected to a switch that is configured to use the policy manager, the user registration information corresponding to the server would be available to the switch. Hence, the switch would be able to assign a particular server (as a "user") to a particular VLAN based on the user registration information provided by the network policy manager. Like user role based VLAN derivation, VLAN derivation based on network policy and user registration is rather restrictive, since each user has to be configured for the disclosed system to derive a specific VLAN.

Loop Avoidance

It's important to note that the solution disclosed herein has a built-in loop avoidance mechanism. Specifically, if a packet is blindly flooded on all available VLANs, the packet may incur a loop. Even the spanning tree protocol (STP) would become dysfunctional with respect to loop avoidance, as the loop is due to flouting of the flooding rules.

With embodiments of the present disclosure, flooding always happens across VLANs. That is, a packet received on one VLAN by a switch will never be on the same VLAN by the same switch. For example, a "user" packet is flooded over a service VLAN and not on any user VLANs. Similarly, a "server" packet is flooded on all user VLANs available in the user VLAN membership table and/or list, and not on any service VLANs.

The cross flooding happens only for packets received from wire (e.g., an end device) on native switch. A forwarded packet over trunk port goes through normal flooding based on existing bridge entries, and is never chosen for cross flooding. Therefore, the forwarded packet would meet the normal STP rules for loop avoidance. Accordingly, a "user" packet and/or a "server" packet will not undergo a loop.

Processes for Selective Service-Based VLAN Flooding

Figure 5:
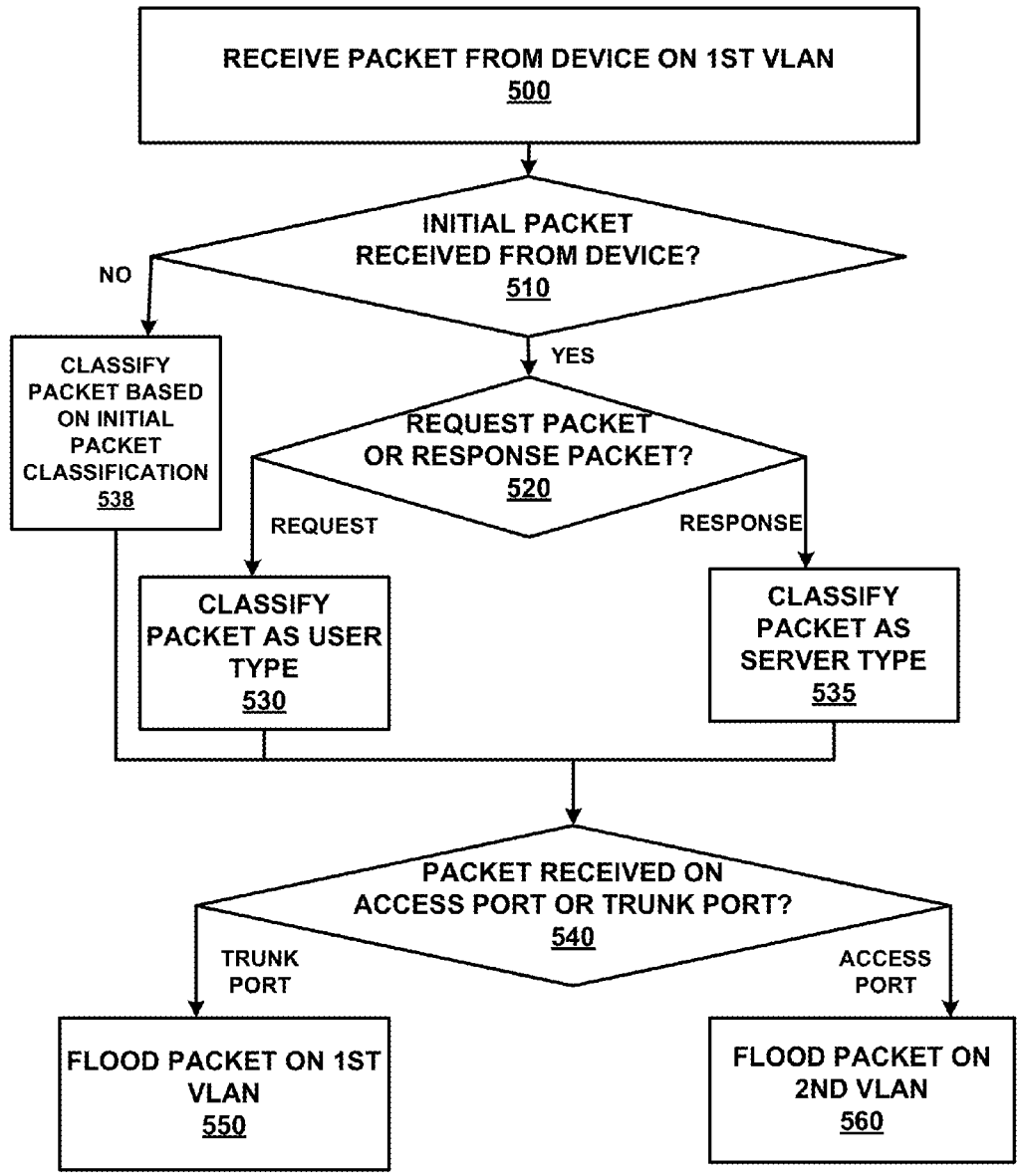
FIG. 5 is a flowchart illustrating an exemplary process for selective service-based VLAN flooding according to embodiments of the present disclosure.

FIG. 5 is a flowchart illustrating exemplary processes for selective service-based VLAN flooding. As illustrated in FIG. 5, during operations, the disclosed system receives a packet from a device on a first virtual local area network (operation 500). The system then determines whether the packet is an initial packet received from the device (operation 510). If not, the system classifies the packet based on the initial packet classification (operation 538).

If the received packet is the initial packet from the device, the system proceed to determine whether the packet is a request packet or a response packet, e.g., by performing a deep packet inspection (operation 520). If the packet is a request packet, the system classifies the packet as a user type (operation 530); if the packet is a response packet, the system classifies the packet as a server type (operation 535).

Next, the system determines whether the packet is received via an access port or a trunk port (operation 540). If the packet is received via a trunk port, the system floods the packet on the first VLAN, i.e., the same VLAN as the packet is received from (operation 550). If the packet is received via an access port, the system floods the packet on a second VLAN, i.e., a different VLAN from which the packet is received on.

Moreover, when the packet is classified as a user type packet, the packet will be flooded on the service VLANs. When the packet is classified as a server type packet, the packet will be flooded on the user VLANs.

System for Selective Service-Based VLAN Flooding

Figure 6:
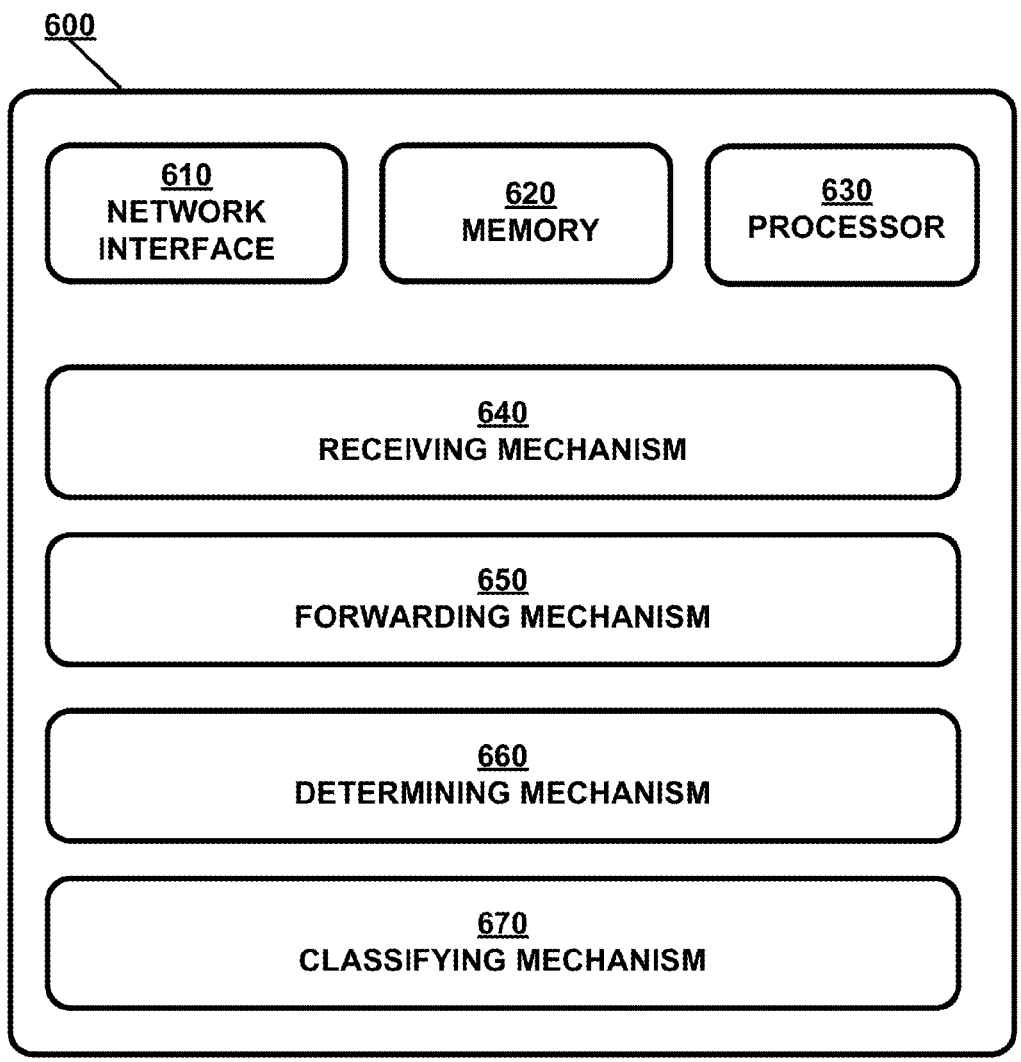
FIG. 6 is a block diagram illustrating an exemplary system for selective service-based VLAN flooding according to embodiments of the present disclosure.

FIG. 6 is a block diagram illustrating a network device system for selective service-based VLAN flooding according to embodiments of the present disclosure. Network device 600 includes at least a network interface 610 capable of communicating to a wired network, a memory 620 capable of storing data, a processor 630 capable of processing network data packets, and a number of mechanisms coupled to the processor 630. The mechanisms include, but are not limited to, a receiving mechanism 640, a forwarding mechanism 650, a determining mechanism 660, and a classifying mechanism 670, etc. Note that, network device 600 may be used as a network switch, network router, network controller, network server, etc. Furthermore, network device 600 may serve as a node in a distributed or a cloud computing environment.

Network interface 610 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 610 may be software-defined and programmable, for example, via an Application Programming Interface (API), and thus allowing for remote control of the network device 600.

Memory 620 can include storage components, such as, Dynamic Random Access Memory (DRAM), Static Random Access Memory (SRAM), etc. In some embodiments, memory 620 includes one or more VLAN membership table or list to store membership information of user VLANs and service VLANs. In some embodiments, the user VLAN membership information is dynamically maintained to reflect the active user VLANs that have packet transmissions within a predetermined period of time.

Processor 630 typically includes a networking processor that is capable of processing network data traffic. In some embodiments, processor 630 may include multiple processing cores and/or ASICs.

Receiving mechanism 640 generally receives packets via network ports, such as an access port or a trunk port. The network ports are configured for one or more VLANs.

Forwarding mechanism 650 generally forward a copy of received packet to one or more other VLANs. For example, when a user packet is received on a user VLAN from an end device via an access port, forwarding mechanism 650 forwards a copy of the user packet to all service VLANs. When a service packet is received on a user VLAN from a server via an access port, forwarding mechanism 650 forwards a copy of the service packet to all user VLANs. If a packet is received on a trunk port, the packet is forwarded to the same VLAN that it is received from. Note that, in order to achieve zeroconf, service VLAN can be derived dynamically based on a variety of factors.

Determining mechanism 660 generally determines whether the packet is received from an access port or a trunk port. Also, determining mechanism 660 can determine whether the packet is a response packet or a request packet. Furthermore, determining mechanism 660 may determine whether the packet is an initial packet received from a device, etc.

Classifying mechanism 670 generally classifies a packet as either a user type packet or a server type packet, for example, based on deep packet inspection. If the packet is an initial packet from the device, and determining mechanism 660 determines that the packet is a request packet, classifying mechanism 670 will classify the packet as a user type packet. On the other hand, If the packet is an initial packet from the device, and determining mechanism 660 determines that the packet is a response packet, classifying mechanism 670 will classify the packet as a server type packet. If the packet is not an initial packet from the device, classifying mechanism 670 will classify the packet as the same type as the initial packet from the device.

According to embodiments of the present disclosure, network services provided by network device 600, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer-readable storage medium storing machine readable instructions for a plurality of operations that are executed by one or more mechanisms, including a hardware processor, implemented within a network device, the plurality of operations comprising:
   receiving a packet originated from a device received on a first virtual local area network;
   in response to the packet being an initial received packet originated from the device,
      inspecting the initial packet to determine whether the packet is a request packet or a response packet;
      classifying the initial packet as a user packet type if the packet is determined to be a request packet;
      classifying the initial packet as a server packet type if the packet is determined to be a response packet; and
      classifying subsequent packets originated from the device to be the same packet type that the initial packet is classified as; and
   forwarding a copy of the packet to a second virtual local area network based on the classifying, wherein the second virtual local area is different from the first virtual local area network, and wherein the device is a member of the first virtual local area network but not a member of the second virtual local area network.

2. The non-transitory computer-readable storage medium of claim 1, further comprising:
   determining whether the packet is received from an access port or a trunk port;
   in response to the packet being received from a trunk port on the first virtual local area network, forwarding a copy of the packet to the first virtual local area network.

3. The non-transitory computer-readable storage medium of claim 1, wherein inspecting the initial packet comprises performing
   performing a deep packet inspection on the initial packet to determine whether the packet is a request packet or a response packet.

4. The non-transitory computer-readable storage medium of claim 1, wherein the first virtual local area network (VLAN) corresponds to a user VLAN and the second virtual local area network corresponds to a service VLAN in response to the device comprising a user device and the packet corresponding to a user packet type, and
   wherein the first virtual local area network (VLAN) corresponds to a service VLAN and the second virtual local area network corresponds to a user VLAN in response to the device comprising a server and the packet corresponding to a server packet type.

5. The non-transitory computer-readable storage medium of claim 1, wherein the packet is flooded on the second virtual local area network corresponding to a user VLAN if the packet is classified as a server packet type.

6. The non-transitory computer-readable storage medium of claim 1, wherein the packet is flooded on the second virtual local area network corresponding to a server VLAN if the packet is classified as a user packet type.

7. The non-transitory computer-readable storage medium of claim 1, wherein the first virtual local area network comprising a service virtual local area network (VLAN) can be dynamically derived based on one or more of:

a pre-configured physical address list and VLAN mapping;
a user role assigned to the device;
a specific service protocol;
a network policy manager; and
a user configuration corresponding to the device.

8. The non-transitory computer-readable storage medium of claim 1, further comprising:
maintaining a first membership list for the first virtual local area network and a second membership list for the second virtual local area network; and
configuring a trunk port based on the first membership list and the second membership list.

9. The non-transitory computer-readable storage medium of claim 8, wherein the first membership list comprises a plurality of active user VLANs, and wherein a user VLAN entry is removed from the first membership list in response to no packet is transmitted within a predetermined period of time on a user VLAN corresponding to the user VLAN entry.

10. A network device comprising:
a processor;
a memory;
a network interface to receive one or more data packets; and
a receiving mechanism coupled to the processor, the receiving mechanism to receive a packet originated from a device received on a first virtual local area network,
wherein the processor is to:
determine whether the packet is a request packet or a response packet in response to the packet being an initial received packet originated from the device;
classify the initial packet as a user packet type if the packet is determined to be a request packet;
classify the initial packet as a server packet type if the packet is determined to be a response packet;
classify subsequent packets originated from the device to be the same packet type that the initial packet is classified as; and
forward a copy of the packet to a second virtual local area network based on the classifying, wherein the second virtual local area is different from the first virtual local area network, and wherein the device is a member of the first virtual local area network but not a member of the second virtual local area network.

11. The network device of claim 10, further comprising:
a determining mechanism coupled to the processor, the determining mechanism to determine whether the packet is received from an access port or a trunk port,
wherein a copy of the packet is forwarded to the first virtual local area network in response to the packet being received from a trunk port on the first virtual local area network.

12. The network device of claim 10, wherein a deep packet inspection is performed to determine whether the packet is a request packet or a response packet in response to the packet being an initial received packet originated from the device.

13. The network device of claim 10,
wherein the first virtual local area network (VLAN) corresponds to a user VLAN and the second virtual local area network corresponds to a service VLAN in response to the device comprising a user device and the packet corresponding to a user packet type, and
wherein the first virtual local area network (VLAN) corresponds to a service VLAN and the second virtual local area network corresponds to a user VLAN in response to the device comprising a server and the packet corresponding to a server packet type.

14. The network device of claim 10, wherein the packet is flooded on the second virtual local area network comprising a user VLAN in response to the packet being classified as a server packet type.

15. The network device of claim 10, wherein the packet is flooded on the second virtual local area network comprising a server VLAN in response to the packet being classified as a user packet type.

16. The network device of claim 10, wherein the first virtual local area network comprising a service virtual local area network (VLAN) can be dynamically derived based on one or more of:
a pre-configured physical address list and VLAN mapping;
a user role assigned to the device;
a specific service protocol;
a network policy manager; and
a user configuration corresponding to the device.

17. The network device of claim 10,
wherein a first membership list is maintained in the memory for the first virtual local area network and a second membership list is maintained in the memory for the second virtual local area network; and
wherein a trunk port is configured based on the first membership list and the second membership list.

18. The network device of claim 17, wherein the first membership list comprises a plurality of active user VLANs, and wherein a user VLAN entry is removed from the first membership list in response to no packet has been transmitted within a predetermined period of time on a user VLAN corresponding to the user VLAN entry.

19. A network device comprising:
at least one port to receive a packet originated from a device on a first virtual local area network, wherein the device is a member of a first virtual local area network but not a member of a second virtual local area network; and
at least one circuit to:
determine whether the packet is received on an access port of the at least one port or a trunk port of the at least one port;
flood the packet in the second virtual local area network in response to determining the packet is received on the access port; and
flood the packet in the first virtual local area network in response to determining the packet is received on the trunk port.

20. The network device of claim 19, wherein the at least one circuit is to:
determine whether to flood the packet on the first virtual local area network or the second virtual local area network based on a classification of the packet as a user packet type or a server packet type.

* * * * *